June 13, 1939.   L. L. GRETERMAN   2,162,167
AUTOMATIC BOLT-UP DEVICE
Filed Sept. 29, 1937
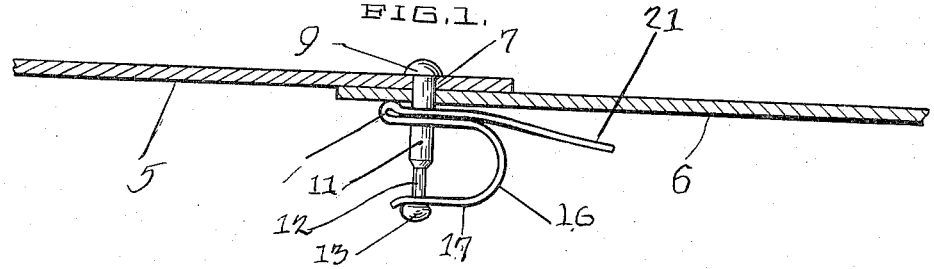
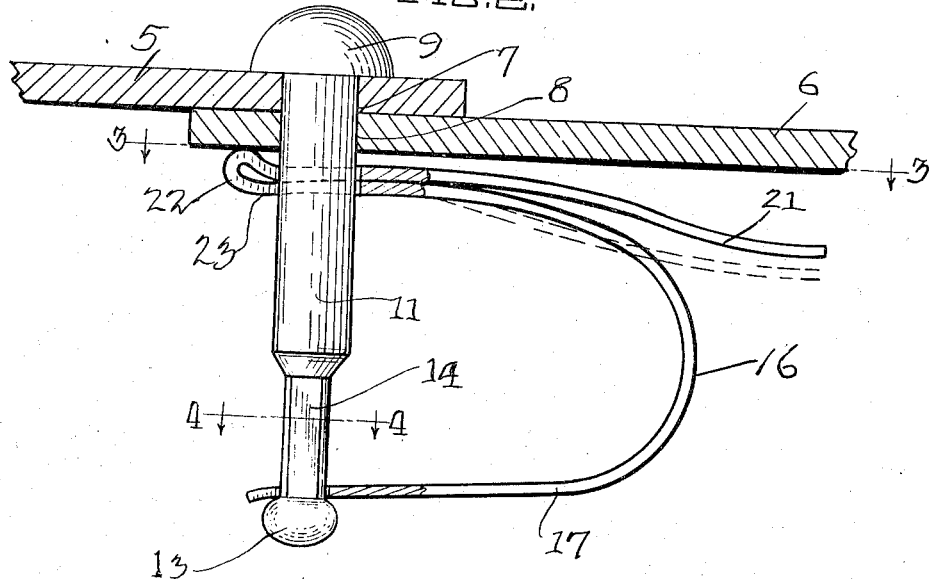
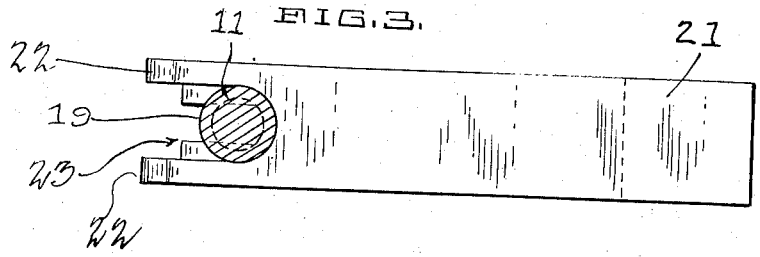
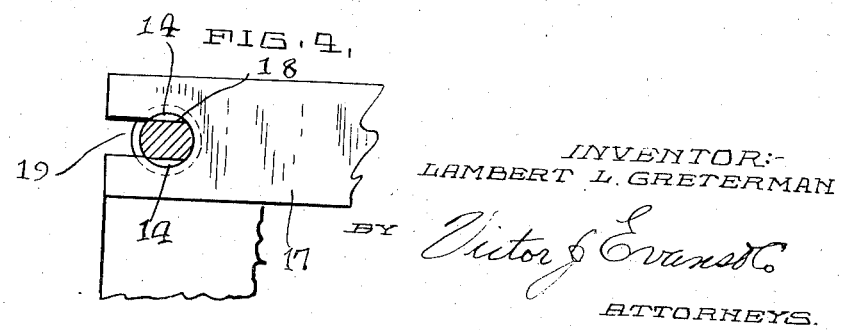
INVENTOR:-
LAMBERT L. GRETERMAN
BY Victor J. Evans & Co.
ATTORNEYS.

Patented June 13, 1939

2,162,167

UNITED STATES PATENT OFFICE 2,162,167

AUTOMATIC BOLT-UP DEVICE

Lambert L. Greterman, Santa Monica, Calif.

Application September 29, 1937, Serial No. 166,445

2 Claims. (Cl. 85—8)

This invention relates to improvements in a device used to temporarily bolt plates together and is adapted to be used primarily in the building of wings and like parts of airplanes.

The principal object of the invention is to produce what may be termed "an automatic bolt-up device" that coacts with a wedge or spring clip element to effect a proper positioning of the said automatic or temporary bolt for holding or drawing two plates together, thus enabling said plates to be secured in close contact for receiving the enlarged permanent rivet.

A further object is to produce a device of this character which is simple in construction, positive in action, and that is strong and durable.

Other objects and advantages will be apparent during the course of the following description.

In the accompanying drawing forming a part of this specification and in which like numerals are employed to designate like parts throughout the same, Fig. 1 is a side elevation of my improved bolt and clip, illustrating the manner in which the device functions to retain overlapping plates in position;

Fig. 2 is an enlarged view of the same, with the clip or wedge element being shown partly in section;

Fig. 3 is a horizontal sectional view taken on the line 3—3 of Fig. 2; and

Fig. 4 is a horizontal section taken on the line 4—4 of Fig. 2.

In producing the present invention, I have endeavored to overcome the disadvantages and objections incident to conventional methods of applying a temporary bolt for holding plates together.

In the manufacture of airplanes, particularly in the building of the wings and other parts, each new sheet of metal is lapped over the edge of the other sheet; then a hole is drilled through said sheets. Heretofore, a bolt or screw has been inserted to hold said sheets in place until other holes were drilled, and then permanent rivets placed therein. The sheet was then riveted solid; then the bolt or screw was taken out and an enlarged permanent rivet forced into the hole, which was provided with screw threads.

In other instances, manufacturers have used a small bolt, commonly called "a stove bolt", while others have resorted to the use of a screw and have placed threads in the metal as the hole was drilled therein.

In the present invention, by the employment of the particular type of rivet as disclosed, and its co-operating clamp, the two pieces of metal can be held firmly together. The same results can be accomplished as heretofore, and the time element of taking the bolt or screw out of the sheets after the riveting operation has been accomplished is much shorter; and it is obvious that with this device, it is only necessary to pull off the clip, and the small or temporary bolt can be readily extracted from the plates.

In the accompanying drawings wherein for the purpose of illustration is shown a preferred embodiment of my invention, the numeral 5 designates a plate; the numeral 6, an adjoining plate, both plates having their edges overlapped. Through these plates holes are punched to receive rivets. These holes are designated by the numerals 7 and 8. In assembly a temporary bolt is employed, which bolt has a head 9, a body portion 11, a reduced portion 12, and a rounded extremity 13. The reduced portion 12 has flattened sides 14. After this bolt is pressed through the holes 7 and 8, a substantially U-shaped clip is engaged therewith. One extremity 17 of the clip has a circular opening 18 positioned therein and of slightly larger diameter than the reduced portion 12 of the bolt and said opening 18 communicates with a slot 19 of substantially the same width as the reduced flattened sides 14 of said pin or bolt shank. The other extremity of the clip is bent upon itself, and the extremity forms a handle 21. A nose 22 is formed where the return bend occurs, and it will be noted by viewing Fig. 2 that this nose is bent upwardly so as to space the clip from the plate 6. The nose 22 and a portion of the clip are slotted as shown at 23, so that the clip will partially encircle the body 11 to the extent that the nose 22 will bear against the underside of the plate 6 at a point offset from the fulcrum point of the end 17 where it contacts the lower headed end of the bolt 13.

After the clip has been placed upon the bolt, it may be rotated say, through an arc of 90°, which will lock the reduced portion of the clip in the circular opening 18 which is capable of receiving the flattened end section 14 of the pin or bolt, as above set forth. The fact that the nose contacts the plate 6 at a point offset from the fulcrum point prevents the clip from jarring loose, as the clip would have to compress in passing through its arc about the fulcrum point for accidental removal. The spring tension of the clip, therefore, maintains the same in adjusted position until manually removed.

From the foregoing description it will be obvious that the bolt will function to hold the two pieces of metal firmly stationary, that the same can be installed and removed quickly, and further that the device as applied will in no way injure the inside of the hole, so that the said hole may be drilled the correct size at the beginning, which will cancel one operation previously utilized.

Furthermore, this particular bolt may be made in various sizes and lengths, and irrespective of the sizes and lengths employed will accomplish the same function and principle as the type illustrated in the accompanying drawing.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. A bolt-up device for holding overlapped plates together, embodying a bolt shank having a head formed thereon and capable of being inserted through openings in said overlapped plates, a reduced section formed on said shank and having a head at its free end, said reduced section having flattened sides, and a looped spring clip to be applied to said bolt shank and having its ends slotted to receive respectively the larger section of the shank and the reduced flattened section thereof, one end portion of said clip being bent upon itself transversely of its slot, the clip at the bend projecting laterally from the loop to form two end contact points capable of frictionally bearing against the undersurface of one of said plates, and the opposite slotted end of the clip having a rounded opening communicating with the slot thereof and the opening being of slightly larger diameter than the slot and reduced section whereby when the clip is in place and is given a substantially one-quarter turn the clip will be locked to the reduced section.

2. A bolt-up device for holding overlapped plates together embodying a bolt shank having a head formed thereon and capable of being inserted through openings in said overlapped plates, a reduced section formed on said shank and having a head at its free end, said reduced section having flattened sides, and a looped spring clip to be applied to said bolt shank, one end portion of the clip being bent upon itself to form contact points to engage one of the plates and having a slot therein to receive and embrace the larger section of the bolt shank, and the opposite end of the clip having a slot therein and terminating in an opening of slightly larger diameter than the width of the latter slot to receive the reduced flattened end of the shank whereby when the clip is applied to the bolt and given a substantially one-quarter turn, the bolt and clip will be locked together.

LAMBERT L. GRETERMAN.